June 13, 1972     TAKEO NOJIMA     3,669,515

BALL BEARING STRUCTURE

Filed June 24, 1970

INVENTOR.
TAKEO NOJIMA

BY *Seed, Berry & Dowrey*

ATTORNEYS

United States Patent Office 3,669,515
Patented June 13, 1972

3,669,515
BALL BEARING STRUCTURE
Takeo Nojima, Chiba-ken, Japan, assignor to Jupitor Corporation of Washington, Seattle, Wash.
Filed June 24, 1970, Ser. No. 49,453
Int. Cl. F16c *35/06, 33/60;* B60b *17/00*
U.S. Cl. 308—16        5 Claims

ABSTRACT OF THE DISCLOSURE

The present invention relates to a roller bearing structure wherein the axis of the force bearing wheel is mounted at an angle of 20 to 30 degrees relative to the major force component exerted upon the structure. The structure is such that the main force supporting roller bearings are captured by three bearing races providing three point contact with each bearing, thus eliminating the need for a cage.

BACKGROUND OF THE INVENTION

With the number of various transporting devices which continuously use wheels in modern day-to-day living, it is desirable to improve the efficiency of the wheel supporting structure as well as to decrease the bulk of said structures. Specifically, the desire is to have a structure which requires less motive force to turn the wheel and one which keeps replacement to a minimum. A direct result of decreasing the bulk of the wheels and the necessary supporting structure is the opportunity to increase the interior dimensions of the supported structure and thus to provide a more usable volume of space supported by the wheels without increasing the outside dimensions.

In railroad cars, for example, if the need for an axle between opposing wheels were eliminated, the floor of the car could be placed closer to the railroad tracks thereby providing a more usable volume per length of railroad car.

This invention relates to bearing structures which are usable to support the wheels of a railroad car which are operative in aligned pairs, thus eliminating the need for axle connection between each pair of wheels. The inventive concept is also usable upon any supportive wheel structure such as the idler wheels for a Caterpillar type track on tanks or tractors.

The main object of the present invention is to provide a wheel supporting structure with minimal frictional resistance against rotation.

In accordance with this object as a feature of the present invention, there is provided a bearing structure wherein there is minimal friction producing contact with the roller bearings.

Another object of the present invention is to provide a bearing structure which makes the overall height of the load supporting assembly lower allowing a greater capacity for an identical overall height.

In accordance with this object and as a feature of the present invention, there is provided a bearing structure which allows the axis of the load supporting wheel to be at an angle and eliminating the need for an axle to the main force thereby allowing a lowering of the structure supported by the wheel assembly.

Still another object is to provide a bearing structure wherein the roller bearings are held captive without the need for a cage.

In accordance with this object and as a feature of the present invention, there is provided a bearing structure for a wheel and shaft combination including three bearing races placed relative to each other in a configuration which holds the bearings captive.

Yet another object of the present invention is to provide a bearing structure which is relatively simple, economical and of strong construction.

In accordance with this object and as another feature of the present invention, there is provided a bearing structure wherein the number of parts is minimal and the assemblage of parts is such that the efficiency is increased thereby decreasing wear.

The above and other features of the invention including the various novel details of construction and combinations of parts will now be more particularly described with reference to the accompanying drawings as pointed out in the claims.

It will be understood that the particular assembly and body of the invention is shown by way of illustration only and not as a limitation of the invention.

The principles and features of this invention may be employed and varied in numerous embodiments without limiting the scope of the invention.

BRIEF DESCRIPTION OF THE DRAWINGS

As seen in FIG. 1, applicant's invention comprises a housing 2 which is designed to be fastened to a load supporting structure by bolts or other suitable means (not shown). As shown in the figure, the housing 2 would have planar surfaces generally parallel and perpendicular to the direction of the primary load L. Joining the two perpendicular outer surfaces of the housing 2 is an internally extending flange 4 at an angle to the direction of primary load. There is a generally circular hole 6 through the flange 4 which has extending therethrough the shaft 8 of the load supporting wheel 10. As shown in the present embodiment, there is a threaded portion 12 on the inner end of the shaft to which is attached a nut 14 which serves to hold radial bearings 16 in position.

Figure 1:
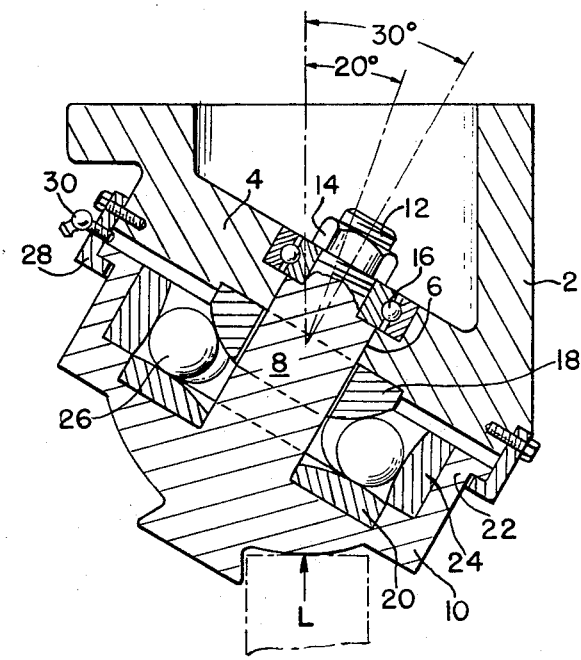
FIG. 1 is a section through a load supporting wheel embodying one species of applicant's invention.

On the outer surface of the flange there is mounted one annular bearing race 18. The load supporting wheel 10 which is integral with shaft 8 has mounted on its inboard surface a second bearing race 20. The wheel likewise has a rearwardly extending flange 22 which has a third bearing race 24 mounted to the interior surface. Placed between the three bearing surfaces 18, 20 and 24, which have generally convex bearing contacting surfaces, are a plurality of roller bearings 26 which serve as the main load carrying bearings.

The combination of the three bearing races form a triangular cage structure which captures the balls.

The counter acting forces between ball and cage combination described above and the nut 14 serve to retain the wheel and shaft structure in proper position to the housing 2. There is provided for convenience during assembly and to eliminate the ingress of dirt and other pollutants, a clamp or shield 28 which is bolted to the housing 2 and overlaps the inboard end of the flange 22. For convenience in lubrication, there is provided an oil or grease fitting 30 which communicates with the void surrounding the balls 26.

Figure 2:
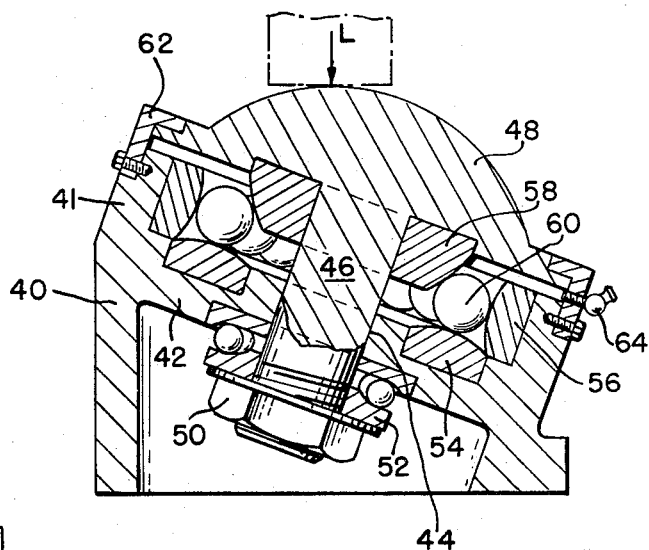
FIG. 2 is a section through another load supporting wheel embodying a second species of applicant's present invention.

For maximum efficiency during rotation of the wheel by maintaining three point contact with the roller bearings, the axes of the shaft upon which the load supporting wheel is mounted, is placed at an angle of between 20 and 30 degrees to the direction of prime force or load denoted by the letter L (FIGS. 1 and 2).

Figure 3:
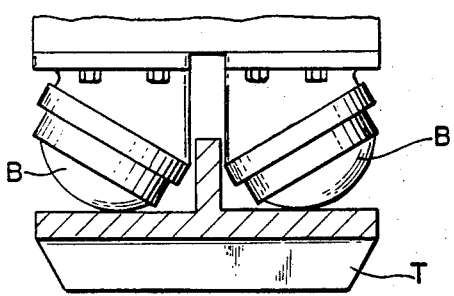
FIG. 3 is a schematic representation of applicant's inventive bearing structure as used for idler wheels for a tracked vehicle.

As seen in FIG. 3, the bearing assembly is placed in an orientation wherein the load supporting wheel surface is in an upward rather than a downward direction as shown in FIG. 2. The assembly comprises a housing 40 having an inwardly extending flange 42 which in turn has an annular hole 44 through which the shaft 46 of load supporting wheel 48 extends. The inner end of the shaft 46 is threaded and has mounted thereupon a nut 50 which holds between itself and the flange 42 a thrust bearing 52. In a similar manner to that described with regard to FIG. 2, the outer surface of flange 42 supports an annular bearing race 54. In this species, the housing includes an annular outwardly extending flange 41. The outwardly extending flange of the housing 40 supports a second annular bearing race 56 and the inner surface of the wheel 48 supports a third bearing race 58.

Because of the angle at which the axis of the shaft 46 is placed in relationship to the main force, i.e. 20 to 30 degrees, the three bearing races 54, 56 and 58 have essentially point contact with a plurality of balls 60 mounted therebetween. It will be obvious that the points of contact with each of the bearing races will form a circle which is coaxial with the axis of shaft 46 and likewise that each will have a different radius and be within a different plane thereby holding the balls 60 in place eliminating the need for a separate cage.

For the purpose of preventing the ingress of dirt or other pollutants, there is provided a clamp or cover 62 bolted to the outer edge of the housing 40 in such a manner that it overlaps the exterior portion of the wheels 48 and is secured to flange 41. The lubrication is provided to the balls and races by means of an oil or grease fitting 64 having communication with the void area surrounding the balls 60.

As seen in FIG. 3, there is a schematic showing of one possible use of the present bearing structure. There is shown a pair of the bearing structures B which are the subject matter of the present aplication placed in a back-to-back slightly spaced relationship supporting the track T of a caterpillar type vehicle. The wheels which are mounted within applicant's bearing structure would serve as idler wheels between the two drive wheels for the caterpillar track.

The embodiments of the invention in which an exclusive property or privilege is claimed are defined as follows:

1. A bearing structure for a rotatable shaft having at its outer end portion a wheel having a bearing surface comprising in combination;

a hollow housing for retaining and supporting the shaft at an angle to the direction of load, said housing having an inwardly projecting flange having a hole therethrough to accommodate a shaft, a shaft and wheel combination having the shaft generally perpendicular to the flange and extending therethrough, an annular antifriction bearing mounted upon the shaft in a position abutting the flange on the side of the flange opposite the wheel providing a relatively friction free mounting for the rotatable shaft, three annular bearing races mounted to the wheel or the housing on the same side of the flange as the wheel, at least one of the bearing races secured to the housing, and at least one of the bearing races secured to the shaft and wheel combination, a plurality of roller bearings each captured between the races by three point bearing contact, thus eliminating the bearing retainer, means securing the shaft in a position where at the balls are retained in rolling point contact with the three annular bearing races when the wheel and shaft combination is rotated.

2. A bearing structure as in claim 1 wherein two of the races are mounted upon the housing.

3. A bearing structure as in claim 1 wherein two of the races are mounted upon the wheel.

4. A bearing structure as in claim 1 wherein the angle is between about 20° to 30° to the load.

5. A bearing structure as in claim 1 wherein the inner or ball contacting surfaces of the annular bearing races are curved outwardly toward the balls to assure a one point contact with each of the individual balls.

References Cited
UNITED STATES PATENTS

| | | | |
|---|---|---|---|
| 2,920,918 | 1/1960 | Nojima | 295—1 |
| 2,614,898 | 10/1952 | Adams | 308—196 |
| 2,979,360 | 4/1961 | Nojima | 16—18 A |
| 2,686,397 | 8/1954 | Annen | 308—196 |

FOREIGN PATENTS

| | | | |
|---|---|---|---|
| 926,579 | 7/1949 | Germany | 308—196 |

MARTIN P. SCHWADRON, Primary Examiner

B. GROSSMAN, Assistant Examiner

U.S. Cl. X.R.

295—1; 308—196